Figure 1:
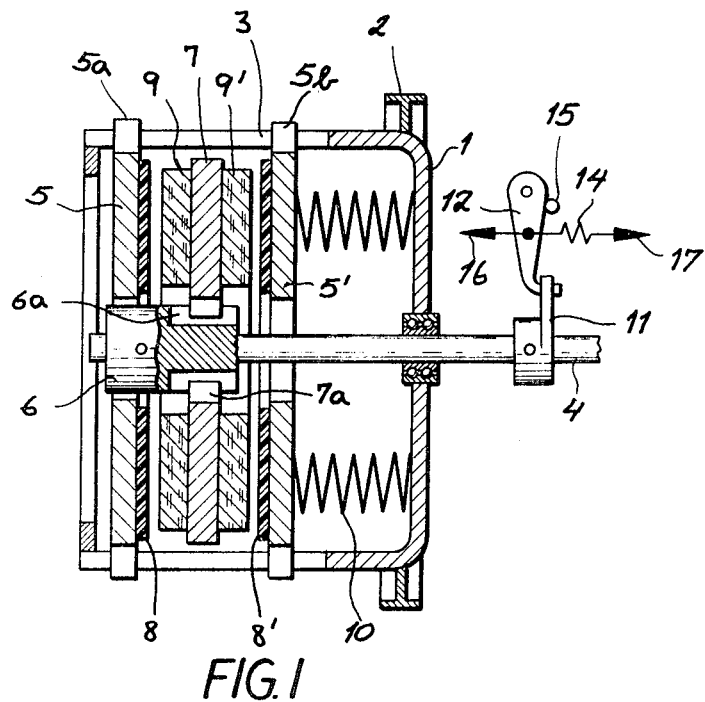

United States Patent
Martini et al.

[15] 3,664,472
[45] May 23, 1972

[54] COUPLING WITH THERMOPLASTIC AND CELLULOSIC FRICTION DISC

[72] Inventors: Karl Martini; Peter Forster; Dieter Bierbaum; Gunther Halm, Karl-Marx-Stadt, all of Germany

[73] Assignee: Kombinat VEB Messgeratewerk Zwonitz, Zwonitz, Germany

[22] Filed: Dec. 10, 1969

[21] Appl. No.: 883,834

[52] U.S. Cl..................192/12 R, 192/70.14, 192/107 M, 192/24, 64/30 R
[51] Int. Cl....................................F16d 67/02, F16d 69/02
[58] Field of Search...............192/70.14, 107 M, 12 D, 18 B, 192/12 R, 107

[56] References Cited

UNITED STATES PATENTS

| | | | |
|---|---|---|---|
| 1,739,399 | 12/1929 | Karle | 192/107 |
| 2,351,997 | 6/1944 | Morrill | 192/12 D X |
| 2,960,190 | 11/1960 | Holper | 192/107 M X |
| 3,085,667 | 4/1963 | Lang | 192/107 X |
| 3,240,301 | 3/1966 | Smith | 192/107 M X |
| 3,344,292 | 9/1967 | Hurst | 192/12 D X |

*Primary Examiner*—Benjamin W. Wyche
*Attorney*—Karl F. Ross

[57] ABSTRACT

In a friction clutch, in order to ensure the transmission of a torque that is substantially independent of the temperatures generated by the slippage of the contacting driving and driven friction elements urged into engagement by spring means, the work face of one friction element is a thermoplastic material, such as Teflon, while the work face of the other friction element is cork.

11 Claims, 2 Drawing Figures

PATENTED MAY 23 1972   3,664,472

Karl Martini
Peter Förster
Dieter Bierbaum
Günther Halm
INVENTORS.

BY

Karl F. Ross
Attorney

COUPLING WITH THERMOPLASTIC AND CELLULOSIC FRICTION DISC

Our present invention relates to a friction clutch of the type therein two or more generally disk-shaped friction elements are urged into mutual engagement by spring means for transmitting a limited torque from a driving member to a driven member.

The invention relates particularly to slipping clutches associated with means for selectively blocking and releasing the driven member.

When the driven member is released, it is rotated by the driving member by virtue of a torque determined by the frictional forces between the interengaging friction elements.

On the other hand, when the driven member is blocked and thus prevented from rotating, the friction element associated therewith is also stationary while the friction element associated with the driving member continues to rotate with resulting slippage between the contacting friction elements, thus giving rise to heat generated by friction.

Clutches of the above-outlined structure find particular application an the intermittent driving of low-inertia loads, such as the shafts of teletypewriters, where in instantaneous start of rotation of a driven member in response to manual action or an automatic command signal is desired.

It is known to use felt disks, with or without impregnation, as friction elements in such clutches. In order to protect the felt disks from burning by the heat generated during slippage, continuous lubrication thereof with oil or other lubricants has been customary. Owing to the fact that the magnitude of the transmitted torque is a function of the viscous properties of the lubricant and these properties, in turn, vary with the heat generated in the clutch, prolonged operation as well as changes in ambient temperature may bring about intolerable variations in torque transmission.

To mitigate the temperature dependence of the torque without lubrication or impregnation, dry friction disks with coacting friction layers of carbon and steel have been proposed. Owing to their high modulus of elasticity, however, the carbon disks are incapable of fully conforming to the surface of the steel disks and thus do not compensate for unavoidable irregularities such as surface unevenness and deviation from plane parallelism. Thus, point contacts result that lead to localized heat generation, scoring and frictional corrosion, all tending to reduce the life expectancy of the friction elements.

It is an object of our invention to provide an improved friction clutch of simple, inexpensive structure incorporating co-operating dry clutch elements that ensure the transmission of a substantially temperature-independent torque.

A more particular object is to provide a novel combination of coacting friction layers substantially completely eliminating the effect of temperature on the transmitted torque.

A further object of our invention is to provide a clutch wherein, by virtue of the substantial thermal capacity of the friction layers, the transmitted torques and the angular velocities may be larger than in conventional clutches of this type.

It is also an object to provide a clutch requiring practically no maintenance, thus favoring a long service life and defect-free operation.

These objects are realized, pursuant to out present invention, by a clutch assembly wherein the contacting layers of confronting work faces of co-operating friction elements are constituted by a thermoplastic resin and a resilient cellulosic material. Among the cellulosic materials (such as cork and balsa wood) satisfying this description, cork has been found particularly suitable; as a thermoplastic material we prefer to use a fluorinated hydrocarbon polymer, especially polytetrafluoroethylene (Teflon). We have found that such a couple does not suffer from the disadvantage of steel-and-cork combinations, for example, which exhibit a relatively high adhesive friction (as compared with their sliding friction) upon relative standstill of the coacting disk faces so that the changeover to relative slippage is difficult to achieve.

Figure 2:
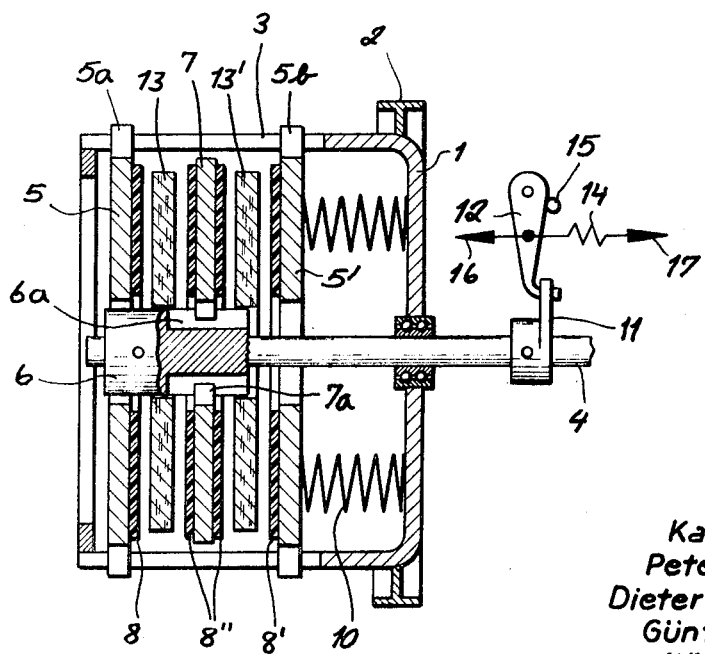

The above and other features of our invention will become more fully apparent from the ensuing detailed specification of two representative embodiments given with reference to the accompanying drawing in which:

FIG. 1 is a schematic, axial sectional view of a clutch structure incorporating the invention; and FIG. 2 is a similar view of a modification of the structure shown in FIG. 1.

The clutch assembly shown in FIG. 1 comprises a housing 1 integrally formed with an external circumferential gear ring 2.

Within housing 1 there are disposed two axially spaced clutch disks 5, 5' respectively provided with radially outwardly directed lugs 5a, 5b received in axially parallel slots 3 of the housing.

The housing 1 with the disks, 5' is coaxially journaled, with freedom of independent rotation, on a shaft 4. The disks rotate in unison with housing 1 but are axially slidable with respect thereto.

The aforedescribed components 1, 2, 5, 5' constitute the driving part of the friction clutch.

To shaft 4 there is keyed a hub 6 provided with axial splines 6a. A drive clutch disk 7, having a complementarily indented central opening 7a, is mounted on shaft 4 in such a manner that formations 6a and 7a are in a meshing relationship. Thus, the disk 7 and the shaft 4 are constrained to rotate in unison but disk 7 is axially slidable with respect to shaft 4.

The components 4, 6, 7 constitute the driven part of the friction clutch.

The sides of driving disks 5, 5' facing the driven disk 7 are provided with thermoplastic layers 8, 8', the two confronting sides of disk 7 having cork layers 9, 9' bonded thereto.

Within housing 1 there are disposed a plurality of prestressed compression springs 10 urging the two driving disks 5, 5' and the interposed driven disk 7 into frictional contact with one another.

In both FIGS. 1 and 2 the stacked disks are shown slightly axially spaced apart for the sake of clarity. In actual practice, the thermoplastic layers 8, 8' are maintained in continuous frictional contact with the cork layers 9, 9'.

A slightly modified clutch structure embodying the invention is depicted in FIG. 2. Here, not only the driving disks 5, 5' but also the two faces of driven clutch disk 7 are provided with respective thermoplastic layer 8, 8', 8''. Adjacent either side of clutch disk 7 there is inserted a floating cork disk 13, 13'. Thus, similarly to the structure shown in FIG. 1; an alternating arrangement of frictionally engaging plastic and cellulosic work faces of juxtaposed friction elements is provided.

In operation, the driving components 1, 2, 5, 5' of the clutch are continuously rotated by means including a pinion (not shown) engaging spur gear 2. A detent or catch 12 is normally held by a spring 14 against a stop 15 to project into the orbit of a dog 11 keyed to driven shaft 4; upon withdrawal of this detent (arrow 16), shaft 4 rotates by virtue of the torque frictionally transmitted from driving disks 5, 5' to driven disk 7. When the catch 12 is restressed (arrow 17) to assume a blocking position, the limited torque transmitted by friction to driven shaft 4 is overcome and thus the rotation thereof — along with that of the other driven components 6, 7 — is interrupted. As the driving components 1, 2, 5, 5' of the clutch continue to rotate, slippage occurs between the frictionally interengaging clutch elements.

The thermoplastic layers 8, 8', 8'', advantageously consisting of polytetrafluoroethylene (Teflon), can be applied to their supporting disks by dispersion coating to build a layer up to a maximum thickness of, preferably, 100 microns; the cork layers are considerably heavier, as shown, particularly when constituting self-supporting members 13, 13' as shown in FIG. 2 To facilitate heat dissipation, the disks 5, 5', 7 are advantageously made of metal.

It will be apparent that the cork disks 13, 13' of FIG. 2 could be replaced by metallic or other self-supporting disks floatingly mounted on shaft 4 and provided with layers of a material (cork or Teflon) dissimilar from the material forming the coacting friction layers on the confronting disk faces.

We claim:
1. A friction clutch comprising:
a rotatable housing centered on an axis;
a shaft coaxially journaled in said housing with freedom of rotation relative thereto;
a stack of disks coaxially surrounding said shaft within said housing and forming pairs of confronting friction surfaces, said stack including two outer disks rotatively coupled with said housing and an inner disk rotatively coupled with said shaft, the friction surfaces of each pair consisting of one surface of a thermoplastic material and another surface of cellulosic material;
resilient means axially urging said disks into mutual frictional contact between said confronting surfaces; and
detent means engageable with said shaft for selectively holding same against frictional entrainment by said housing.

2. A clutch as defined in claim 1 wherein said thermoplastic resin is a fluorinated hydrocarbon polymer.

3. A clutch as defined in claim 1 wherein said cellulosic material is cork.

4. A clutch as defined in claim 1 wherein said cellulosic material and said resins are cork and polytetrafluoroethylene, respectively.

5. A friction clutch for transmitting a limited torque substantially independently of temperature, comprising:
a driving member,
a driven member entrainable by said driving member; and
a plurality of coaxially juxtaposed friction elements including a first element rotatively coupled with said driving member and a second element rotatively coupled with said driven member, one of said elements being a metallic disk having a coating of polytetrafluoroethylene at most 100 microns in thickness, the other of said elements being composed of cork and being engageable with said coating on said disk.

6. A clutch as defined in claim 5 wherein said outer disks are metallic and provided on their inner surfaces with layers of said thermoplastic resin.

7. A clutch as defined in claim 6 wherein said housing is provided with axially extending peripheral slots, said outer disks having lugs slidably received in said slots.

8. A clutch as defined in claim 6 wherein said stack further includes a pair of floatingly disposed disks between said outer disks and said inner disk.

9. A clutch as defined in claim 8 wherein said floatingly disposed disks consist in their entirety of cork.

10. A clutch as defined in claim 6 wherein said thermoplastic resin forms a layer of a thickness up to substantially 100 microns on each of said inner surfaces.

11. A clutch as defined in claim 5 wherein said shaft is provided with a radially projecting dog, said detent means comprising a catch interposable in the orbit of said dog.

* * * * *